United States Patent Office 3,595,613
Patented July 27, 1971

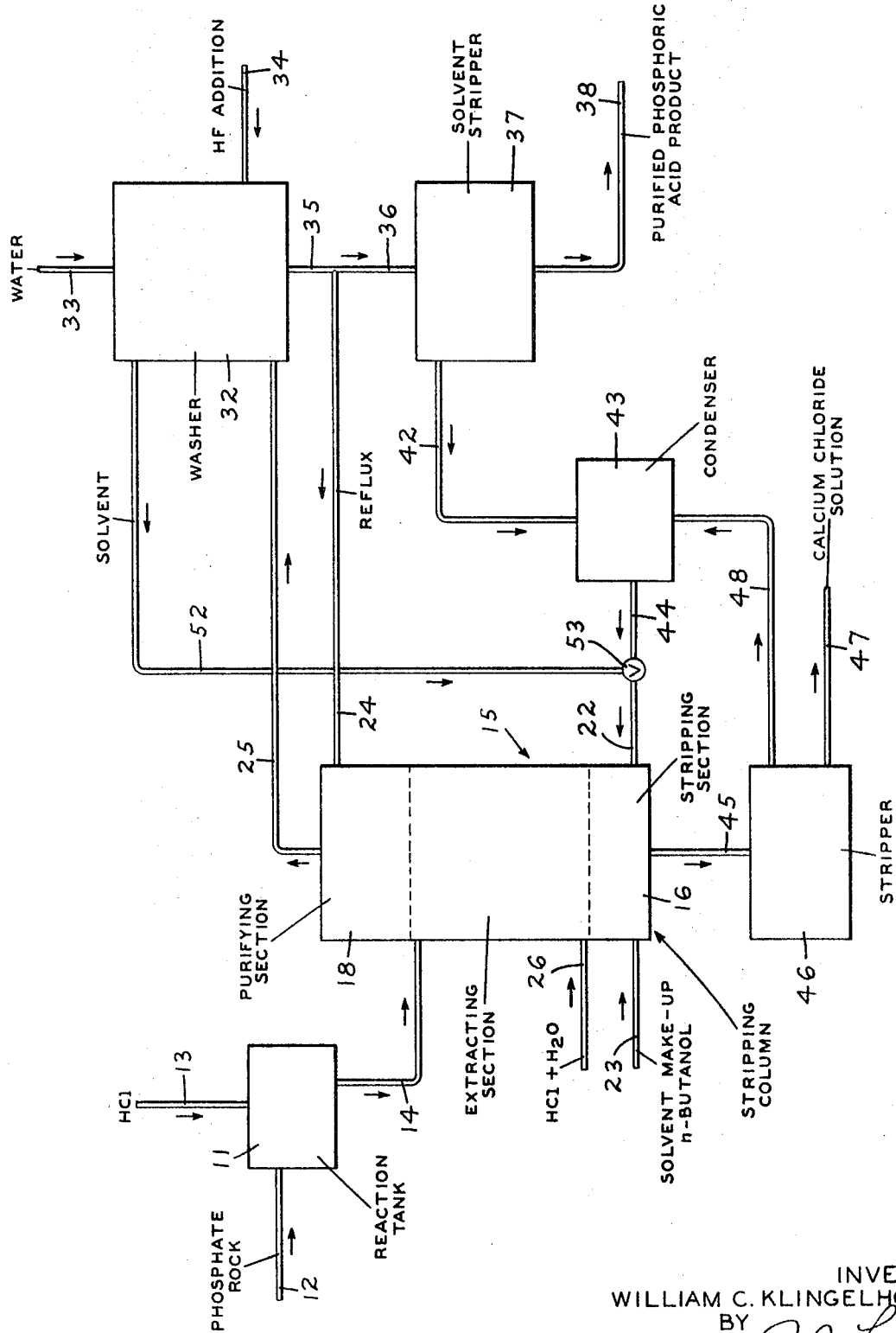

3,595,613
PRODUCTION OF PHOSPHORIC ACID
William C. Klingelhoefer, Hopewell, Va., assignor to
Allied Chemical Corporation, New York, N.Y.
Filed July 1, 1968, Ser. No. 741,706
Int. Cl. B01d 11/04; C01b 25/18, 25/22
U.S. Cl. 23—165                                    2 Claims

ABSTRACT OF THE DISCLOSURE

Recovering phosphoric acid from a reaction mixture produced by reacting hydrochloric acid with phosphate rock by mixing the reaction mixture with a lower aliphatic alcohol to form a first aqueous layer and a first organic layer which contains the phosphoric acid. The layers are separated and a water-soluble fluoride compound is added to the first organic layer. The organic layer is then washed with water to form a second aqueous layer and a second organic layer and the aqueous layer which contains the phosphoric acid is separated out.

BACKGROUND OF THE INVENTION

The present invention relates to the preparation of phosphoric acid from phosphate rock and in particular the present invention relates to an improvement in the process for recovery of purified phosphoric acid from an aqueous solution containing salts and other impurities.

Phosphoric acid is produced from phosphate rock or any minerals or ores containing phosphates which may be associated with other materials such as silica, silicates, carbonates, sulfates, fluorides, chlorides and compounds of calcium, magnesium, aluminum, iron and vanadium. It also has been known that phosphoric acid may be produced by acidulation of phosphate rock with sulfuric acid. This involves dissolution of the phosphatic portion of the material as phosphoric acid and formation of a solid calcium sulfate which is removed along with other insoluble materials by filtration. The calcium sulfate mass usually is a waste product. The above process is attractive when sulfuric acid is available at low cost.

Some phosphoric acid is produced by oxidation of elemental phosphorus and reaction of the $P_2O_5$ product with water. Elemental phosphorus is produced by treatment of phosphate rock with carbon and silica in electric furnaces. The cost of electric power is a large factor in the cost of producing elemental phosphorus. Production of phosphoric acid by this method is attractive only where relatively cheap electric power is available.

Recently there has been an increasing interest in phosphoric acid processes based on acidulation of phosphate rock using nitric acid or hydrochloric acid. The calcium salts formed from such treatments are quite soluble in contrast with the low solubility of calcium sulfate. Because of this fact these processes often have employed a solvent extraction step to separate the phosphoric acid from the calcium salts and other materials. Such solvent extraction processes depend on the selective action of a partially miscible non-aqueous solvent for dissolving the phosphoric acid in preference to the salts and impurities, and on the rapid and relatively complete separation of the extract phases from the aqueous phases.

Of particular concern with respect to prior art liquid-liquid solvent extractions for recovery of phosphoric acid is the rapid and complete separation of solvent and aqueous phases. In solvent extraction processes, the aqueous solution of the phosphoric acid and salts is intimately contracted with an immiscible organic liquid having solvent power for the phosphoric acid, and the phosphoric acid is extracted into the organic phase. The organic phase is then separated and treated with water to recover an aqueous solution of phosphoric acid. Unfortunately, complete, rapid separation of the aqueous and organic phases due to entrainment at the interface does not occur, and where essentially complete separation is not achieved, the entrained aqueous phase will contaminate the organic phase and vice versa. The reasons for such entrainment is not known to me but believed to be due to carryover into the organic phase of contaminants in the reaction products resulting from acidulation of mineral phosphate with nitric acid or hydrochloric acid.

It is one object of the present invention to provide an improved process of producing phosphoric acid by the acidulation of phosphate rock with hydrochloric or nitric acid.

It is another object of the present invention to provide a more economical and efficient process of producing phosphoric acid.

It is a further object of the present invention to provide an improved process of economically producing substantially pure phosphoric acid.

SUMMARY OF THE INVENTION

In accordance with the present invention, phosphoric acid is recovered from a reaction mixture produced by reacting an inorganic acid selected from the group consisting of hydrochloric and nitric acids with phosphate rock. The reaction mixture is mixed with a lower aliphatic alcohol to form a first aqueous layer and a first organic layer which contains the phosphoric acid. The layers are then separated and a water-soluble fluoride compound is added to the first organic layer. The first organic layer is then washed with water so as to form a second aqueous layer and a second organic layer. The second aqueous layer containing the phosphoric acid is then separated from the organic layer. The second aqueous layer may then be concentrated to give a phosphoric acid solution of the desired concentration.

BRIEF DESCRIPTION OF THE DRAWING

The drawing is a schematic illustration of the invention according to a preferred embodiment of the process.

DESCRIPTION OF THE PREFERRED EMBODIMENT

The preferred embodiment of the present invention is described with respect to the acidulation of phosphate rock with hydrochloric acid. However, the present process is equally applicable when the acidulation is carried out with nitric acid.

With reference to the drawing, phosphate rock is introduced into reaction tank 11 through a conveyance line 12. Although phosphate rock is preferably used in the process, any minerals or ores containing phosphates which may be associated with other materials such as silica, silicates, carbonates, sulfates, fluorides, chlorides and compounds of calcium, magnesium, aluminum, iron, and vanadium are suitable. The phosphate rock should be acidulated with at least a stoichiometric amount of acid and preferably 5–50% by weight excess acid.

Hydrochloric acid is added to the tank through line 13. The acid used is in the form of an aqueous solution that is not too highly concentrated and preferably of a concentration of between 20–40% by weight. Thus, the reaction mixture in reaction tank 11 contains phosphoric acid and impurities such as HF, $SiO_2$, and $SiF_4$. The presence of these impurities is explained by the fact that phosphate rock generally contains apatite, $3[Ca_3PO_4)_2]$. $CaF_2$ or similar material along with varying amounts of $SiO_2$, silicates, carbonates and compounds of iron, aluminum, magnesium and other materials. When phosphate rock is treated with strong acid to produce phosphoric acid, the calcium and other basic materials are largely converted to salts of the strong acid while the fluoride appears to be converted to HF or $HR_2SiF_6$. The chemistry is relatively complex. Hydrofluoric readily reacts with $SiO_2$ to form $SiF_4$. The $SiF_4$ reacts vigorously with water as follows:

$$3SiF_4 + 2H_2O \rightarrow 2H_2SiF_6 + SiO_2$$

The $H_2SiF_6$ in aqueous solution is believed to be partially dissociated and hydrolyzed, so that HF, $SiO_2$, and $SiF_4$ are formed. When $H_2SiF_6$ is vaporized it decomposes into $SiF_4$ and 2HF.

The reaction mixture in reaction tank 11 typically has the following composition:

| Cpds.: | Parts |
| --- | --- |
| $H_3PO_4$ | 11.0 |
| $CaCl_2$ | 29.4 |
| HCl | 2.4 |
| $H_2SiF_6$ | 1.0 |
| Mg, Al, Fe, chlorides | 0.8 |
| $H_2O$ | 55.4 |

This mixture is passed through line 14 into an extractor, generally designated 15. Organic solvent is introduced at the bottom of extracting column 15 which rises and mixes with the aqueous reaction mixture introduced through line 14. The organic solvent phase rises to the top of the column 15 while the aqueous phase sinks to the bottom of column 15. The organic solvent is a lower aliphatic alcohol and preferably a lower aliphatic alcohol that has 4–8 carbon atoms. Examples of such alcohols are n-butanol, n-pentanol, and isoamyl alcohol. In this embodiment n-butanol is used. The n-butanol will selectively dissolve phosphoric acid present in the reaction mixture.

In the preferred embodiment the extraction of the phosphoric acid present in the reaction mixture takes place in stripping column 16, extracting column 15, and purifying column 18. The extraction apparatus is preferably an apparatus arranged for continuous counter-current extraction using reflux. The extractor may consist of a series of mixer-settler units but in the preferred embodiment extracting columns are used.

Recycled n-butanol is introduced at the bottom of stripping column 16 through line 22. Fresh make-up n-butanol is also introduced at the bottom of column 16 through line 23. The aqueous reaction mixture containing phosphoric acid as well as other impurities is introduced at the top of column 18 through line 24. The n-butanol rises up the column mixing with the aqueous reaction mixture and extracting phosphoric acid and hydrochloric acid from the reaction mixture. The aqueous reaction mixture almost free of phosphoric acid passes down the column. Generally the total amount of n-butanol admitted through lines 22 and 23 is in a weight ratio with the reaction mixture of 8:1 to 1:1 and preferably 5:1 to 2:1. The n-butanol containing basically phosphoric acid rises to the top of column 18 and discharges through line 25. The n-butanol rises through column 15 and comes into contact with the aqueous reaction mixture which was introduced at the top of the column through line 14 and which passes down the column. Excess hydrochloric acid, 5–15% by weight of the stoichiometric amount necessary to react with the phosphate present in the phosphate rock, is added at the bottom of extraction column 15 through line 26. This is done to increase the acidity of the reaction mixture so that it has a pH at least less than 2.0, so as to aid in the extraction of the phosphoric acid and prevent precipitation of the phosphate salts. Most of the phosphoric acid is absorbed in the n-butanol in column 15. The n-butanol containing a substantial amount of phosphoric acid then passes to the top of column 15 and then into the bottom of purifying column 18. The n-butanol phase passes up column 18 coming into contact with an aqueous reflux solution of purified phosphoric acid which is introduced at the top of column 18 through line 24. The impurities in the n-butanol phase are largely removed and carried away by the aqueous phase as an aqueous phosphoric acid-hydrochloric acid solution back into extracting column 15.

The purified n-butanol solution is then passed out of the top of column 18 through line 25 into the bottom of washer 32. The n-butanol solution containing the phosphoric acid is washed with water in a butanol to water weight ratio of 8:1 to 1:1 and preferably 5:1 to 2:1. The wash water is passed into washer 32 through line 33. Then an aqueous solution of a water-soluble fluoride is admitted into the washer vessel 32 through line 34. With no addition of fluorine to the process at this point, it was found that relatively stable emulsions tend to form in washer 32 which prevented rapid or complete separation of the solvent phases from the aqueous phases and seriously interfered with the operation. The present invention overcomes these difficulties by addition of fluoride ions, preferably in the form of an aqueous solution. Any fluoride compound that ionizes in an aqueous solution to produce fluoride ions can be added as an aqueous solution or in solid form. Generally an inorganic water-soluble fluoride compound such as hydrogen fluoride, sodium fluoride or potassium fluoride is used. The inorganic water-soluble fluoride compound may be added as an aqueous solution, in the solid form or in any other convenient form. In order to prevent emulsification only a minor amount of fluoride ion need be added, generally a fraction of a percent by weight of the organic solvent containing phosphoric acid mixture. A substantial portion of the fluoride ion originally contained in the reaction mixture resulting from acidulating phosphate rock with nitric acid or hydrochloric acid is removed in the extractor 15 with the result that emulsions are formed in washer 32. I have found that the addition of small amounts about 0.5 to 3.0% soluble fluoride by weight of the organic solution avoids this difficulty. In the preferred embodiment the fluoride ion is added through line 34 in the form of an aqueous solution of hydrogen fluoride in which the concentration of the hydrogen fluoride is 20–70% and preferably 40–60%. The water that is added at the top of washer 32 through line 33 passes down the washer and mixes with the n-butanol solution extracting the phosphoric acid. The aqueous layer that is formed contains phosphoric acid, hydrochloric acid with small amounts of solvent, HF, and $H_2SiF_6$ and minor amounts of impurities. Part of this aqueous solution which is in a weight ratio of 1:3 to 1:8 with the total aqueous solution is returned as reflux to purifying column 18 through lines 35 and 24. The rest of the solution is passed through lines 35 and 36 into solvent stripper 37 wherein the solution is heated in the range of about 70° C. to 110° C. to evaporate any n-butanol present. The purified phosphoric acid product discharges through line 38 and typically has the following composition:

| Cpd.: | Parts |
| --- | --- |
| $H_3PO_4$ | 10.7 |
| $H_2O$ | 60.0 |
| $H_2SiF_6$ | 0.2 |
| HF | 0.2 |

The n-butanol evaporated in stripper 37 is passed through line 42 to condenser 43 where it is condensed into a liquid and then passed through line 44 and 22 to stripping column 16.

The aqueous solution from the bottom of stripping column 16 is transferred through line 45 to stripper 46 where the dissolved n-butanol is distilled out. The residual solution containing mainly calcium chloride with small amounts of phosphate, hydrochloric acid and nearly all of the impurities present in the crude mixture, is passed out of the stripper through line 47. The residual solution typically has the following composition:

| Cpd.: | Parts |
| --- | --- |
| $H_3PO_4$ | 0.3 |
| $CaCl_2$ | 29.4 |
| HCl | 0.1 |
| $H_2O$ | 80.1 |
| $H_2SiF_6$ | 0.8 |

The vapors of n-butanol from stripper 46 are released through line 48 into condenser 43 where they are condensed into a liquid.

Liquid n-butanol from washer 32 is then returned through line 52 and valve 53 where it joins with the n-butanol passing through line 44. The combined n-butanol is then transferred through line 22 into the bottom of stripping column 16. The purifying column 18, the extracting column 15, the stripping column 16, and the washer 32 are generally operated within the temperature range of 20–80° C. and preferably 20–50° C.

Under the present process there is a high recovery of phosphoric acid. Typically, the recovery of phosphoric acid from the acidulated reaction mixture is about 97 weight percent.

The examples below illustrate the present invention and are not intended to limit the invention.

EXAMPLE 1

A suitable crude phosphoric acid starting material for the extraction operation may be produced by treatment of phosphate rock with nitric acid. One such feed material was made from Florida phosphate rock pebble having the following analysis:

| Cpds.: | Weight percent |
| --- | --- |
| $P_2O_5$ | 31.2 |
| CaO | 46.8 |
| Organic carbon | 0.30 |
| Carbonate carbon | 0.98 |
| Fluoride | 3.67 |
| $SiO_2$ | 7.8 |
| Insolubles | 8.0 |

The rock was reacted with excess 50% nitric acid and the resulting acid solution was decanted from insolubles to produce crude phosphoric acid feed mixture containing 10.1% $H_3PO_4$, 32.4% $Co(NO_3)_2$, 20% $HNO_3$, and 1% $H_2SiF_6$.

The crude phosphoric acid obtained by treatment of phosphate rock with nitric acid followed by separation of insoluble materials was extracted with isoamyl alcohol in a 21-stage countercurrent laboratory extractor. The feed solution (50 ml.) was added at stage 10, recycled solvent plus make-up (250 ml.) was added at stage 1, nitric acid (10 ml. containing 4.5 g. $HNO_3$) was added at stage 2 and wash water (50 ml.) was added at stage 21 where the washed solvent was withdrawn and added to stage 1. The product acid was withdrawn at stage 14 and part of this was returned as reflux at stage 13.

Initial operation showed good phase separations, but on continuing the test, the separations became very poor due to formation of heavy emulsions. HF as a 50% solution was added to stages 10 to 18 and was found to break the emulsions and allow good phase separations. With continued operation it was found that addition of about 0.1 gram of HF at stage 15 in each feed cycle prevented formation of the emulsions and allowed good operation.

The compositions of feed and products were as follows:

| Composition wt. percent | Feed (50 ml., 76 g.) | Product (55 ml., 64 g.) | $CaCl_2$ solution remaining (59 ml., 76.4 g.) |
| --- | --- | --- | --- |
| $P_2O_5$ | 7.3 | 8.4 | 0.48 |
| Ca | 7.9 | 0.01 | 6.3 |
| Fe | 0.3 | <0.01 | 0.26 |

EXAMPLE 2

Crude phosphoric acid was prepared by treatment of 2,000 parts of calcined Florida phosphate rock containing 32.40% $P_2O_5$, 47.58% CaO, 0.06% carbon in organic form, 0.54% carbon as carbonate, and about 1.2% $Fe_2O_3$, 3.7% F and 8.1% insolubles, with 1,304 parts of HCl in 3,656 parts of water. The insoluble materials were removed by filtration.

The resulting crude phosphoric acid contained some dissolved iron salts, part of which were in the ferric state. The crude acid was treated with metallic iron to convert this ferric iron into the ferrous state. About 23.1 parts of the metallic iron were dissolved in this treatment.

This material was extracted with n-butanol saturated with water using a 21-stage laboratory counter-current extractor. The feed solution (68.7 parts), containing 8.52% $P_2O_5$, 0.65% Fe, 0.79% F (or 1.0% as $H_2SiF_6$), and about 25% calcium chloride, with small amounts of other materials dissolved during the acid treatment, was added at stage 8. Recycled solvent (84.2 parts) was added to stage 1 while additional hydrochloric acid (5.9 parts of 37% HCl) was added at stage 2. Wash water (50 parts) was added at stage 21 where the washed solvent was withdrawn and added to stage 1 along with make-up n-butanol. The product acid (93 parts), containing 10.3% $P_2O_5$, 0.18% Fe, 0.30% F, 0.14% Ca, 5.06% Cl and less than 0.01% Mg. along with about 8% dissolved butanol, was withdrawn from stage 14 and 39 parts were returned to stage 13 as reflux for the purifying section. The net product was 54 parts with recovery of 96% of the input $P_2O_5$.

Initial operation showed good phase separation, but on continuing the test, the separations became very poor due to formation of heavy emulsions, particularly at stages 15, 16 and 17. Addition of HF at those stages where emulsion had occurred was found to break the emulsions and allow good phase separations. With continued operation it was found that about 0.13 part of HF added at stages 15, 16 or 17 prevented formation of the emulsions and allowed very good operation.

I claim:

1. A process of recovering phosphoric acid from a reaction mixture produced by reacting an inorganic acid selected from the group consisting of hydrochloric and nitric acids with phosphate rock comprising:

(a) extracting the reaction mixture with a lower aliphatic alcohol selected from the group consisting of n-butanol, n-pentanol and isoamyl alcohol in the presence of an inorganic acid selected from the group consisting of hydrochloric and nitric acids, to form a first aqueous layer containing dissolved calcium salts and a first organic layer which contains the phosphoric acid;

(b) extracting the organic layer with recycled aqueous phosphoric acid to separate residual calcium salts from the organic layer;

(c) separating the organic layer;
(d) adding an aqueous solution of 40–60% by weight of hydrogen fluoride to the organic layer such that the amount of fluoride added to the organic layer is 0.5 to 3.0% by weight of the organic layer;
(e) extracting the organic layer with water so as to form a second aqueous layer which contains phosphoric acid and a second organic layer;
(f) separating the aqueous layer which contains the phosphoric acid from the second organic layer;
(g) recycling part of the aqueous layer containing phosphoric acid to step (b); and
(h) recycling the second organic layer to step (a), whereby rapid separation of the aqueous and organic phases occurs throughout the process.

2. A process of recovering phosphoric acid from a reaction mixture produced by reacting hydrochloric acid with phosphate rock comprising:
(a) extracting the reaction mixture with a lower aliphatic alcohol selected from the group consisting of n-butanol, n-pentanol, and isoamyl alcohol in the presence of hydrochloric acid to form a first aqueous layer containing calcium chloride and a first organic layer which contains the phosphoric acid;
(b) extracting the organic layer with a recycle stream of aqueous phosphoric acid to remove residual calcium chloride from the organic layer;
(c) separating the organic layer;
(d) adding an aqueous solution of 40–60% by weight of hydrogen fluoride to the organic layer such that the amount of fluoride added to the organic layer is 0.5 to 3.0% by weight of the organic layer;
(e) extracting the organic layer with water so as to form a second aqueous layer which contains phosphoric acid and a second organic layer;
(f) separating the aqueous layer which contains the phosphoric acid from the second organic layer;
(g) recycling part of the aqueous layer containing phosphoric acid to step (b); and
(h) recycling the second organic layer to step (a), whereby rapid separation of the aqueous and organic phases occurs throughout the process.

References Cited

UNITED STATES PATENTS 3,298,782    1/1967    Archambault    23—165
3,366,448    1/1968    Martin et al.    23—165

MILTON WEISSMAN, Primary Examiner

U.S. Cl. X.R.

23—312

PO-1050
(5/69)

UNITED STATES PATENT OFFICE
CERTIFICATE OF CORRECTION

Patent No. __3,595,613__  Dated __July 27, 1971__

Inventor(s) __William C. Klingelhoefer__

It is certified that error appears in the above-identified patent and that said Letters Patent are hereby corrected as shown below:

Column 3, line 18, "$3[Cra_3PO_4)_2]$" should be --$3[Ca_3PO_4)_2]$--.

Column 3, line 25, "$HR_2SiF_6$" should be --$H_2SiF_6$--.

Column 5, line 65, "$Co(NO_3)_2$" should be --$Ca(NO_3)_2$--.

Signed and sealed this 28th day of December 1971.

(SEAL)
Attest:

EDWARD M. FLETCHER, JR.        ROBERT GOTTSCHALK
Attesting Officer              Acting Commissioner of Patents